United States Patent [19]

Cantor

[11] Patent Number: 5,728,787
[45] Date of Patent: Mar. 17, 1998

[54] RAPID CURING, NON-CORRODING ADHESIVE COMPOSITION, AND METHOD OF USE

[75] Inventor: Stephen E. Cantor, Cheshire, Conn.

[73] Assignee: Dymax Corporation, Torrington, Conn.

[21] Appl. No.: 666,026

[22] Filed: Jun. 19, 1996

[51] Int. Cl.⁶ .................................................. C08F 2/00
[52] U.S. Cl. .................................... 526/216; 526/301
[58] Field of Search ................................ 526/216, 208

[56] References Cited

U.S. PATENT DOCUMENTS

| | | | |
|---|---|---|---|
| 2,564,292 | 8/1951 | Wolf | 526/216 |
| 2,973,286 | 2/1961 | Ulrich | 526/216 |
| 4,131,728 | 12/1978 | Priddy | 526/216 |
| 4,348,503 | 9/1982 | Bachmann . | |
| 4,352,723 | 10/1982 | Morgan | 526/208 |
| 4,404,345 | 9/1983 | Janssen | 526/208 |
| 4,429,088 | 1/1984 | Bachmann . | |
| 4,432,829 | 2/1984 | Bachmann . | |
| 4,451,523 | 5/1984 | Nativi et al. . | |
| 4,602,073 | 7/1986 | Skoultchi et al. | 526/208 |
| 4,746,685 | 5/1988 | Masuhara et al. . | |
| 4,820,744 | 4/1989 | Kubota et al. . | |
| 4,824,876 | 4/1989 | Matsumoto et al. . | |
| 4,923,905 | 5/1990 | Masuhara et al. . | |
| 4,963,220 | 10/1990 | Bachmann et al. . | |
| 4,964,938 | 10/1990 | Bachmann et al. . | |
| 5,039,715 | 8/1991 | Bachmann et al. . | |
| 5,385,958 | 1/1995 | Bachmann et al. | 526/208 |
| 5,512,608 | 4/1996 | Bachmann et al. | 526/208 |

FOREIGN PATENT DOCUMENTS 0178115   4/1986   European Pat. Off. ........... 526/216

*Primary Examiner*—Joseph L. Schofer
*Assistant Examiner*—N. Sarofim
*Attorney, Agent, or Firm*—Ira S. Dorman

[57] ABSTRACT

The adhesive formulation minimizes corrosion of copper surfaces (e.g., of motor commutators) caused by volatile ingredients of conventional acrylate compositions, and cure speeds are significantly increased thereover.

9 Claims, No Drawings

RAPID CURING, NON-CORRODING ADHESIVE COMPOSITION, AND METHOD OF USE

BACKGROUND OF THE INVENTION

The prior art describes the use of acrylate adhesives to bond a wide variety of substrates (see for example Bachmann U.S. Pat. Nos. 4,348,503, 4,429,088 and 4,432,829). Among their numerous uses, such adhesives are employed to good advantage for securing permanent magnets to rotor and stator bodies in the commercial manufacture of D.C. motors. Typically, in such an application an amine-aldehyde activator formulation will be applied to the mounting surface, with the reactive adhesive formulation being applied to the magnet. The adhesive component is normally used in an excess amount to ensure complete coating, but this causes a fillet of adhesive to be extruded from between the mating surfaces when the magnet and the support are joined. Because it is not adequately contacted with the activator, the extruded fillet fails to cure properly and thus constitutes a source of substances that can contaminate and corrode motor surfaces, most critically the copper commutator.

In order to minimize these problems, it is conventional practice to heat the motor assembly prior to final sealing in order to drive off unreacted volatile components. This is however a time-consuming and inadequate solution, and may itself degrade the quality of the motor produced.

Of the ingredients comprising conventional acrylate adhesives, acrylic acid (a volatile liquid under ambient conditions) is believed to be the primary source of the corrosion and contamination problems noted. The same ingredient also appears to contribute to a tendency for other volatile ingredients of acrylate adhesives (e.g., isobornylacrylate and 2-hydroxylethylmethacrylate) to condense and polymerize on copper surfaces, thereby giving rise additional problems in production and use.

SUMMARY OF THE INVENTION

Accordingly, it is a broad object of the present invention to provide a novel and highly effective acrylate adhesive formulation.

A more specific object of the invention is to provide an acrylate adhesive formulation in which problems of metal corrosion and polymer plating, attributable to volatilization of incompletely cured ingredients, are substantially reduced, if not eliminated entirely.

Related objects of the invention are to provide a novel method for adhesively mounting parts, such as motor magnets and the like, in which post-heating to drive off volatile ingredients is not required and in which problems of metal corrosion and polymer plating, encountered with conventional acrylate adhesives, are substantially reduced, or avoided.

Additional objects of the invention are to provide such an adhesive formulation and method wherein curing of the adhesive occurs very rapidly to enable significantly increased productivity, and to do so without compromise of bond strength or convenience of use, and without sacrifice of other desirable properties.

It has now been found that certain of the foregoing and related objects of the invention are attained by the provision of a liquid adhesive formulation that is catalytically polymerizable to an adhesive solid, comprising: a polymerizable acrylate component, in predominant amount; an active-oxygen free-radical catalyst, in catalytically effective amount; and about 1 to 10 weight percent of an organic acid that is coactive with the catalyst to initiate polymerization in the acrylate component. Both the catalyst and also the organic acid are substantially non-volatile at temperatures below 125° Centigrade, and the formulation is substantially fee from any organic acid, catalyst, or in situ catalyst-forming ingredients that are substantially volatile at such temperatures.

More specifically, 2,5-dimethyl-2,5-di-(benzoylperoxy) hexane has been found to be a highly effective catalyst in the instant adhesive formulations, albeit that other, functionally equivalent catalyst may be substituted, as appropriate. The organic acid may be selected from the class consisting of itaconic acid, maleic acid, salicylic acid, malic acid, phthalic acid, and mixtures of those acids; preferably, a mixture of itaconic acid and maleic acid will be employed. The acrylate component will also preferably comprise a mixture of at least one acrylate monomer and at least one reactive acrylate oligomer, and the formulation will desirably additionally include a catalytically effective amount of a photoinitiator for the acrylate component, which photoinitiator will most desirably be responsive to radiation in the UV spectral region.

Certain of the objects of the invention are attained by the provision of an adhesive composition that comprises an adhesive formulation and an activator formulation, the adhesive formulation being composed as hereinabove set forth. The activator formulation is one that is capable of reacting to chemically activate the catalyst of the adhesive formulation for initiation of polymerization therein. It will preferably comprise an amine-aldehyde condensation product, and the composition will desirably contain the ingredients described above in connection with the more specific and preferred embodiments.

Additional objects of the invention are attained by the provision of a method for bonding surfaces to one another, in which method the liquid adhesive formulation described is applied to at least a first surface that is to be bonded; a second surface is brought into substantial contact with the first surface, and the catalyst is activated so as to effect polymerization of the adhesive formulation. Reaction may be initiated by admixing an activator formulation that is capable of chemically activating the catalyst (e.g., an amine-aldehyde condensation product), usually by applying the activator formulation to the "second" surface, with admixture being effected upon bringing the "first" and "second" surfaces into mutual contact. The method of the invention is particularly advantageously employed in the manufacture of D.C. motors, in which case one of the "first" and "second" surfaces referred to will be the surface of a permanent magnet and the other will be the surface of the motor structure on which it is to be mounted.

DETAILED DESCRIPTION OF THE PREFERRED EMBODIMENTS

Exemplary of the efficacy of the present invention are the following specific examples, wherein amounts are expressed in parts by weight and reaction is conducted under ambient conditions, unless stated otherwise:

EXAMPLE ONE

Part A

An adhesive formulation (A), was prepared by admixing the following ingredients in the amounts indicated in parentheses: polyurethane-acrylate oligomer (39); 2-hydroxy ethyl methacrylate (20); polystyrene impact-modifier resin (12); maleic acid (1.5); acrylic acid (4.5); amorphous fumed silica (3.0); tert-butyl perbenzoate (2.5), as an active oxygen catalyst; and dimethoxy-2-phenylacetophenone (Ciba-Geigy IRGACURE 651) (1.3), as a UV-responsive photo-initiator. This formulation is typical of conventional acrylate adhesives that are chemically activated for bonding of motor magnets, albeit that the defined formulation may also be activated thermally and/or by UV irradiation.

A second formulation (B) was prepared in which the acrylic acid of formulation A was replaced by 3.0 parts of itaconic acid, and in which the tert-butyl perbenzoate was replaced by 2,5-dimethyl-2,5-di(benzoylperoxy) hexane (ATO Chem. LUPEROX 118). This formulation embodies the present invention.

Steel laps, each measuring about 2.5×10×0.16 cm, were freshly sanded. A thin coating of adhesive formulation A was applied to the surfaces of five of the laps, and a like coating of adhesive formulation B was applied to five other laps. A thin layer of an aldehyde-amine activator (DYMAX 501, Dymax Corporation) was applied to each of ten laps, which were then assembled with the adhesive-coated laps in such a manner as to cause end portions of the mated laps to overlap one another by precisely one-half inch. Each of the resultant assemblies was held together firmly with a spring clamp for a 24-hour period, after which tensile strengths were tested using a Tinius Olsen Model SG Locap testing machine, operated at about 15.24 cm (0.5 foot) per minute. The averaged value of tensile strengths achieved using the conventional adhesive (formulation A) was 2376 pounds per square inch (167 Newtons per square meter); the adhesive of the invention (formulation B) exhibited an averaged tensile strength value of 2828 psi (198 N/M$^2$), representing a 19 percent increase over the tensile strength achieved using formulation A.

Part B

A second set of lap assemblies, prepared from formulations A and B as in Part A hereof, were placed in an oven/humidity chamber and maintained for 96 hours at a relative humidity of 100 percent and a temperature of 85° C. The laps were allowed to cool and remain at room temperature for four additional hours, after which they were tested under the conditions described in Part A. The thus conditioned formulation A assemblies were found to have retained, on average, about 48.15 percent of their initial (24-hour cure) tensile strength (i.e., 1144 psi/2373 psi); the formulation B assemblies exhibited a retained tensile strength of about 49.22 percent (i.e., 1392 psi/2828 psi).

Part C

Additional sets of steel lap assemblies were prepared as described in Part A hereof, but with the 24-hour clamped-curing step omitted. The assemblies were tested to determine the averaged values of tensile strength that had developed within the time intervals specified in Table One below (in which tensile strengths are expressed in psi and, in parenthesis, N/M$^2$):

TABLE 1

|  | 1 minute | 2 minutes | 5 minutes |
| --- | --- | --- | --- |
| Formulation A | 238 (16.7) | 468 (32.9) | 680 (47.9) |
| Formulation B | 440 (30.9) | 682 (48.0) | 807 (56.8) |

Part D

Thin films of formulations A and B were separately deposited upon several clean glass slides, to each of which was applied a covering glass slide carrying a layer of the DYMAX 501 chemical activator. Immediately after establishing intimate mutual contact between the adhesive and activator, the slides were manipulated (in their parallel planes) until resistance to movement was noted; i.e., a typical fixture-rate test was performed. The formulation A assemblies exhibited an averaged fixture time (i.e., the time elapsed from initial contact to immobility) of 23 seconds; the averaged fixture time for the formulation B assemblies was 14 seconds.

EXAMPLE TWO

Into each of several one-quart Mason jars were placed (without contacting one another) a commercially available copper motor commutator, polished to a bright luster with emery cloth, and an aluminum dish containing one gram of adhesive formulation A or B, prepared as in Example One. The jars were sealed and heated in an oven for an extended period of time (about 1,000 hours) at 62° C.; a jar containing a commutator only was contemporaneously maintained in the oven to act as a control. The copper commutator surfaces were visually examined at suitable time intervals to detect any tarnish or corrosion development.

At the end of the test period, the commutator subjected to vapors produced from formulation A had developed a dark brown coloration, and showed considerable corrosion. The commutator placed in the jar with the formulation B adhesive exhibited almost no discoloration or corrosion, with surfaces that remained similar in appearance to those of the control. This experiment simulates the manufacture of a D.C. motor having a copper commutator, in the course of which an unpolymerized fillet of the adhesive used for bonding of the magnets is produced.

An essential feature of the present invention resides in the use of a non-volatile organic acid as a component of the free-radical catalyst system. Although itaconic acid has been employed in those of the foregoing Examples that embody the present invention, it will be appreciated that other, functionally equivalent acids, such as maleic, salicylic, malic and phthalic, may be substituted if so desired. In addition to being substantially nonvolatile (i.e., exhibiting a vapor pressure of 2 mm of mercury or less) under ambient (motor) conditions (e.g., from about 20° C. to 125° C.), the acids suitable for use herein should also be capable of cyclic tautomerism, and should exhibit low vapor pressure and, of course, good solubility in the formulation as well.

As will be appreciated from the foregoing examples, the combination of itaconic and maleic acids constitutes a preferred embodiment of the invention, and maleic acid will desirably be present irrespective of any other non-volatile acid species employed. Normally, the non-volatile acid ingredient will constitute about 1.0 to 10.0 weight percent of the polymerizable adhesive formulation; however, satisfactory results may be realized with as little as 0.5, or as much as 14.0, weight percent.

It will be appreciated that the instant adhesive formulations will be substantially free from the volatile acids that are conventionally used in acrylate formulations as catalyst components and/or for adhesion promotion, such as acrylic and methacrylic acids. Although it may not be possible or desirable, as a practical matter, to exclude such acids completely, the amount should not exceed about 0.3 weight percent.

Also essential to the present invention is the use of a free-radical generating, active-oxygen catalyst that is non-volatile under ambient motor conditions (as that term is defined above), coupled with the substantial exclusion of a volatile free-radical, active-oxygen catalyst of the kind conventionally employed in chemically or thermally activated acrylate adhesive systems. As noted above, although 2,5-dimethyl-2,5-di(benzoylperoxy) hexane provides the chemically activated catalyst of the foregoing invention-embodying Examples, other functionally equivalent, non-volatile compounds may be substituted. In addition to non-volatility, the active-oxygen catalyst should be capable of ready introduction into the formulation, and it should be safe and stable against polymerization in the formulation for at least about one year at room temperature.

The amount of the non-volatile catalyst that will be effective in any given instance will vary considerably, and the determination thereof will be evident to those skilled in the art; typically however it will constitute about 0.2 to 4.0 weight percent of the polymerizable formulation.

It will be appreciated that the adhesives of the present invention may be formulated for initiation by chemical reaction, and/or by heat, and/or by means of actinic irradiation. Standard amine-aldehyde condensation products will normally be employed for chemical initiation; alternative chemical activators are however well known in the art, and selection there-amongst will be made readily by the skilled practitioner.

If reaction of the adhesive is to be initiated thermally, the catalyst employed will usually be one that is effective at temperatures well below levels at which intolerable contamination and/or corrosion by volatile adhesive ingredients will be produced. Because however the compositions of the invention also exhibit significantly increased fixture and cure rates, they may be employed to good advantage in applications in which corrosion or contamination is of no concern, or is at least tolerable.

Reactive acrylate monomers that are suitable for use in the instant formulations include, of course, both monofunctional and polyfunctional acrylates and methacrylates. They will generally be reaction products of acrylic acid and/or methacrylic acid with one or more mono- or poly-basic, substituted or unsubstituted, alkyl ($C_1$ to $C_{18}$), aryl or aralkyl alcohols. Acrylates in which the alcohol moiety contains a polar substituent (e.g., an hydroxyl, amine, halogen, cyano, heterocyclic or cyclohexyl group) will often be preferred because crosslinking, or other intermolecular bonding, is promoted thereby. Suitable such monomers are well known in the art, and are in part disclosed for example at line 53, column 6, through line 35, column 7 of Bachmann et al U.S. Pat. No. 4,429,088, and at line 14, column 4 through line 52, column 5 of U.S. Pat. No. 4,451,523. Nevertheless, it might be noted that the following acrylates and corresponding methacrylates (the methacrylate compounds being preferred in many instances) are especially suitable for use in the present compositions, alone or in combination with one another: hydroxyethylacrylate, isobornyl acrylate, tetrahydrofurfuryl acrylate, diethyleneglycol diacrylate, 1,4-butanediol diacrylate, butylene glycol diacrylate, neopentyl glycol diacrylate, octylacrylate and decylacrylate (normally in admixture), polyethyleneglycol diacrylate, trimethylcyclohexyl acrylate, benzyl acrylate, butyleneglycol diacrylate, polybutyleneglycol diacrylate, tripropyleneglycol diacrylate, trimethylolpropane triacrylate, di-trimethylolpropane tetraacrylate, pentaerythritol tetraacrylate, and di-pentaerythritol pentaacrylate.

A free-radical reactive oligomer will normally be included in the composition (alone or, where appropriate, in combination with a cationic-reactive oligomer), but it should be appreciated that such a product is not necessary to the attainment of the cure properties desired herein. Oligomers suitable for use are also well known in the art, and comprise vinyl polymers, acrylic polymers, polyester elastomers, glycol polymers, acrylated epoxies, natural and synthetic rubbers, polyester acrylates, epoxy acrylates, polyether acrylates, alkyd acrylates, polyol acrylates, and the like. However, the use of the urethane polymers and prepolymers will often be found most beneficial, with the latter being especially desirable due to the potential that they afford for further reaction of their pendant isocyanate groups with a reactive functionality (e.g., an hydroxyl group) provided by a suitable acrylate monomer. Di-isocyanate-capped polyethers and polyesters, acrylated by reaction with hydroxyethyl acrylate or hydroxyethyl methacrylate and having a molecular weight of about 400 to 6,000, are particularly preferred.

Vinyl ether reactive diluents may be employed in the instant formulations, usually conforming to the structural formula:

in which formula each of the substituents R, R' and R" independently represents an hydrogen atom, an aliphatic group, or an aromatic group; n is an integer, usually having a value from 1 to 6; and Q represents an aliphatic group, an aromatic group, an alkoxy group, a cycloaliphatic group, an ester group, a polyester group, an ether group, a polyether group, a carbamide group, a carbamate group, an heterocyclic group, or the like, each of such groups optionally being further substituted by an hydroxyl or a vinyl group, or both. Vinyl ether-terminated ester monomers and vinyl ether-terminated aromatic urethane oligomers may find utility herein, and it is believed that analogous compounds in which a sulfur atom replaces the oxygen of the ether group(s) may be used as well (alone or in combination) as a diluent ingredient.

Suitable specific vinyl ether compounds include the following: triethylene glycol divinyl ether, 1,4-cyclohexane dimethanol divinyl ether, propenyl ether of propylene carbonate, n-dodecyl vinyl ether, hydroxybutyl vinyl ether, cyclohexyl vinyl ether, and tetrahydrofurfuryl vinyl ether. Exemplary epoxy compounds that may be employed include 3,4-epoxy-cyclohexylmethyl-3,4-epoxy-cyclohexanecarboxylate, bis-(3,4-epoxycyclohexyl)adipate, diglycidyl ether of bisphenol A, and epoxidized soybean oil. Among the amide compounds that are believed to be suitable are included divinyl urea and the n-vinyl derivatives of formamide, caprolactam, pyrrolidone, and phthalimide.

As will be appreciated from the foregoing Examples, it will often be highly desirable to include a photoinitiator in the formulation of the invention, if for no reason other than to afford more universal utility, and indeed it will be self-evident that a photoinitiator will be prerequisite to certain applications; the formulation will usually therefore normally include at least one photoinitiator. Although photoinitiators suitable for use herein will be apparent to those skilled in the art, specific illustrative compounds that might be identified are dimethoxy-2-phenylacetophenone (Ciba-Geigy IRGACURE 651), 1-hydroxycyclohexylphenyl ketone (Ciba-Geigy IRGACURE 184), and 2-hydroxy-2-methyl-1-phenylpropane-1-one (Ciba-Geigy DAROCURE 1173). A further listing may be obtained by reference to U.S. Pat. No. 4,820,744, particularly at line 43, column 4 through line 7, column 7. Cationic photoinitiators may also be employed, to provide a further cure mechanism in appropriate circumstances. When used, the photoinitiator will normally be incorporated in a concentration of 1 to 8, and preferably no more than 4, percent, based upon the weight of the formulation.

Although described primarily for bonding of surfaces to one another, it will be appreciated that the instant adhesive formulations may be employed for other purposes as well, such as for potting, gap-filling, coating, etc. In those instances in which the formulation is to be used as a potting compound, it will usually be desirable to incorporate a chain transfer agent of the kind that is typically employed in compositions cured by electron beam initiation; e.g., halogen compounds, sulfur compounds, and secondary and tertiary aromatic hydrocarbons such as cumeme, carbon tetrachloride, 1,4-disopropyl benzene, t-butyl benzene, bisphenol A and glycidyl ether derivatives thereof, etc. The use of chain transfer agents may serve to increase the Shore D hardness of the resultant polymer, the degree of which will depend to an extent upon the concentration of the agent in the formulation, which typically will be 0.5 to 5.0, and usually 0.1 to 1.0, weight percent.

Other materials may be incorporated into the instant compositions in addition to the components hereinabove described. For example, "inert" fillers such as wood flour, cornstarch, glass fibers, cotton linters, mica, alumina, silica, and the like, may be used to modify viscosity, improve impact resistance, and for other purposes, and it is conventional to include small percentages of silane coupling agents to increase moisture resistance as well as to enhance bond strength to glass and similar surfaces. Substances such as dyes, fluorescing agents, flame retarders, stabilizers (e.g., the quinones and hydroquinones), viscosity modifiers (thixotropes, thickeners, viscosity reducers), plasticizers, antioxidants, and the like, may be incorporated as well.

The adhesive formulation may be provided as two or more components which produce, in combination, the desired final properties of the cured deposit; such a formulation may afford improved shelf-life and pot-life of the individual and mixed components, rheological and flow characteristics, and other necessary or desirable properties. Although the formulations and compositions of the invention will normally be free from non-reactive solvents, it will be appreciated that small amounts of water and/or other solvents may necessarily be present as a practical matter, such as to facilitate the introduction of an ingredient (e.g., the metal compound, an acid, etc.).

Thus, it can be seen that the present invention provides a novel and highly effective acrylate adhesive formulation and, more specifically, an acrylate adhesive formulation in which problems of metal corrosion and polymer plating, attributable to volatilization of incompletely cured ingredients, are substantially reduced, if not eliminated entirely. The invention also provides a novel adhesive composition, and a novel method for adhesively mounting parts, such as motor magnets and the like, in which post-heating to drive off volatile ingredients is not required and in which problems of metal corrosion and polymer plating, encountered with conventional acrylate adhesives, are substantially reduced, or avoided. Curing of the adhesive occurs very rapidly, to enable significantly increased productivity, and it does so without compromise of bond strength or convenience of use, and without sacrifice of other desirable properties.

Having thus described the invention, what is claimed is:

1. A liquid adhesive formulation that is catalytically polymerizable to an adhesive solid, comprising: a polymerizable acrylate component, in predominant amount; an active-oxygen free-radical catalyst, in catalytically effective amount; and about 1 to 10 weight percent of a mixture of itaconic acid and maleic acid, said catalyst being substantially non-volatile at temperatures below about 125° Centigrade, and said formulation being substantially free from any organic acid that is substantially volatile at said temperatures, substantially free from any catalyst that is substantially volatile at said temperatures, and substantially free from any in situ catalyst-forming ingredients that are substantially volatile at said temperatures.

2. The formulation of claim 1 wherein said catalyst is 2,5-dimethyl-2,5-di(benzoylperoxy) hexane.

3. The formulation of claim 1 wherein said acrylate component comprises a mixture of at least one acrylate monomer and at least one reactive acrylate oligomer.

4. The formulation of claim 1 additionally including a catalytically effective amount of a photoinitiator for said acrylate component that is responsive to radiation in the UV spectral region.

5. A liquid adhesive formulation that is catalytically polymerizable to an adhesive solid, comprising: a polymerizable acrylate component, in predominant amount; 2,5-dimethyl-2,5-di(benzoylperoxy) hexane, in catalytically effective amount; and about 1 to 10 weight percent of a mixture of itaconic acid and maleic acid, said formulation being substantially free from any organic acid that is substantially volatile at said temperatures, substantially free from any catalyst that is substantially volatile at said temperatures, and substantially free from any in situ catalyst-forming ingredients that are substantially volatile at temperatures below about 125° Centigrade.

6. An adhesive composition comprising:

(a) as an adhesive formulation, a polymerizable acrylate component, in predominant amount; an active-oxygen free-radical catalyst, in catalytically effective amount; and about 1 to 10 weight percent of a mixture of itaconic acid and maleic acid, said catalyst being substantially non-volatile at temperatures below about 125° Centigrade, and said formulation being substantially free from any organic acid that is substantially volatile at said temperatures, any catalyst that is substantially volatile at said temperatures, substantially free from and substantially free from any in situ, catalyst-forming ingredients that are substantially volatile at said temperatures; and (b) an activator formulation that is capable of reacting with said catalyst of said adhesive formulation to chemically activate said catalyst for initiation of such polymerization.

7. The composition of claim 6 wherein said activator formulation comprises an amine-aldehyde condensation product.

8. The composition of claim 6 wherein said catalyst is 2,5-dimethyl-2,5-di(benzoylperoxy) hexane.

9. The composition of claim 6 wherein said acrylate component comprises a mixture of at least one acrylate monomer and at least one reactive acrylate oligomer.

* * * * *